United States Patent
Newburn

(10) Patent No.: US 12,361,151 B2
(45) Date of Patent: Jul. 15, 2025

(54) TECHNIQUES FOR REDUCING SECURITY RISKS ASSOCIATED WITH SHARED STORAGE

(71) Applicant: NVIDIA CORPORATION, Santa Clara, CA (US)

(72) Inventor: Christopher John Newburn, South Beloit, IL (US)

(73) Assignee: NVIDIA CORPORATION, Santa Clara, CA (US)

( * ) Notice: Subject to any disclaimer, the term of this patent is extended or adjusted under 35 U.S.C. 154(b) by 149 days.

(21) Appl. No.: 18/326,937

(22) Filed: May 31, 2023

(65) Prior Publication Data
US 2024/0403463 A1    Dec. 5, 2024

(51) Int. Cl.
*G06F 21/62*    (2013.01)
*G06F 21/54*    (2013.01)

(52) U.S. Cl.
CPC .......... *G06F 21/6218* (2013.01); *G06F 21/54* (2013.01)

(58) Field of Classification Search
CPC ....... G06F 21/6218; G06F 21/54; G06F 21/62
See application file for complete search history.

(56) References Cited

U.S. PATENT DOCUMENTS

| | | | |
|---|---|---|---|
| 10,223,094 B2* | 3/2019 | Kotary | G06F 8/60 |
| 11,570,182 B1 | 1/2023 | Tran et al. | |
| 2004/0064485 A1 | 4/2004 | Yoshida et al. | |
| 2004/0186861 A1 | 9/2004 | Phatak | |
| 2011/0216339 A1 | 9/2011 | Kasahara | |
| 2014/0365537 A1 | 12/2014 | Zhao | |
| 2016/0140354 A1 | 5/2016 | Morris | |
| 2022/0207527 A1 | 6/2022 | Surin et al. | |

OTHER PUBLICATIONS

Non Final Office Action received for U.S. Appl. No. 18/326,945 dated Jun. 4, 2025, 17 pages.

* cited by examiner

*Primary Examiner* — Quazi Farooqui
(74) *Attorney, Agent, or Firm* — Artegis Law Group, LLP

(57) ABSTRACT

In various embodiments, a proxy application processes requests to access a storage system. The proxy application receives a client request from a proxy driver executing on a client node. The client request is associated with a client buffer and a location within the storage system. The proxy application converts the client request to a proxy request that is associated with a proxy buffer and the same location within the storage system. The proxy application transmits the proxy request to a storage driver that is associated with the storage system. The storage driver causes a file server to perform at least one operation at the location in accordance with the proxy request.

20 Claims, 4 Drawing Sheets

TECHNIQUES FOR REDUCING SECURITY RISKS ASSOCIATED WITH SHARED STORAGE

BACKGROUND

Field of the Various Embodiments

The various embodiments relate generally to computer systems and computer network security and, more specifically, to techniques for reducing security risks associated with shared storage.

Description of the Related Art

A typical data center includes networked computer servers that collectively provide storage, processing, and networking resources to one or more clients. In some data centers, storage resources are hard partitioned, and the data associated with a given client is strictly segregated (e.g., via different databases) from the data associated with other clients. However, the amount of storage required by different clients over time can fluctuate substantially. As a general matter, providing sufficient segregated storage to meet the fluctuating storage requirements of all client at all times would require a prohibitively large amount of infrastructure and storage resources. Consequently, many data centers share storage resources across different clients, One approach to sharing storage resources across different clients involves implementing one or more shared storage systems within a data center. Each shared storage system includes storage (e.g., one or more disks) as well as one or more file servers and can be accessed by multiple different client nodes. In operation, a given file server included within a shared storage system performs various operations, such as read and write operations, on the storage included within the shared storage system in response to requests received from operating systems executing on the multiple different client nodes. After performing the operations specified in a given request, the file server transmits a response back to the operating system that transmitted the request.

One drawback of the above approach is that security measures for data centers oftentimes are implemented on the different client nodes accessing the data centers. The client nodes are vulnerable to various types of on-line attacks that can compromise those security measures. Once the security measures are compromised, the operating systems executing on the client nodes can be used maliciously to read, modify, and/or delete the data associated with any number of different client nodes stored in the shared storage systems implemented within a data center. In particular, some types of malware can execute within an unprivileged container or virtual machine on a client node in order to evade threat detection mechanisms. The malware can then break out of the container or virtual machine to obtain privileged control (e.g., root access) that enables the malware to control and modify any software applications (including the operating system) to compromise security mechanisms and/or operational restrictions. The malware can then use the operating system to send requests to a file server included in a shared storage system implemented within a data center to access data associated with any number of clients interacting with the data center.

As the foregoing illustrates, what is needed in the art are techniques for reducing security risks when accessing data stored in shared storage.

SUMMARY

One embodiment sets forth a computer-implemented method for processing requests to access a storage system. The method includes receiving a first request from a first proxy driver executing on a first client node, where the first request is associated with a first client buffer and a first location within the storage system; converting the first request to a second request that is associated with a first proxy buffer and the first location within the storage system; and transmitting the second request to a storage driver that is associated with the storage system, where the storage driver causes a file server to perform at least one operation at the first location in accordance with the second request.

At least one technical advantage of the disclosed techniques relative to the prior art is that, with the disclosed techniques, client nodes are able to access shared storage indirectly via one or more proxy nodes that are less vulnerable to on-line security attacks relative to the client nodes. In that regard, with the disclosed techniques, the proxy nodes are not directly controlled by the operating systems or any of the other software executing on the client nodes. Consequently, to the extent malware or other nefarious types of software ends up executing on a client node, the malware or nefarious software is less able to circumvent security mechanisms and/or operational restrictions implemented by the proxy node(s) associated with the client node. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
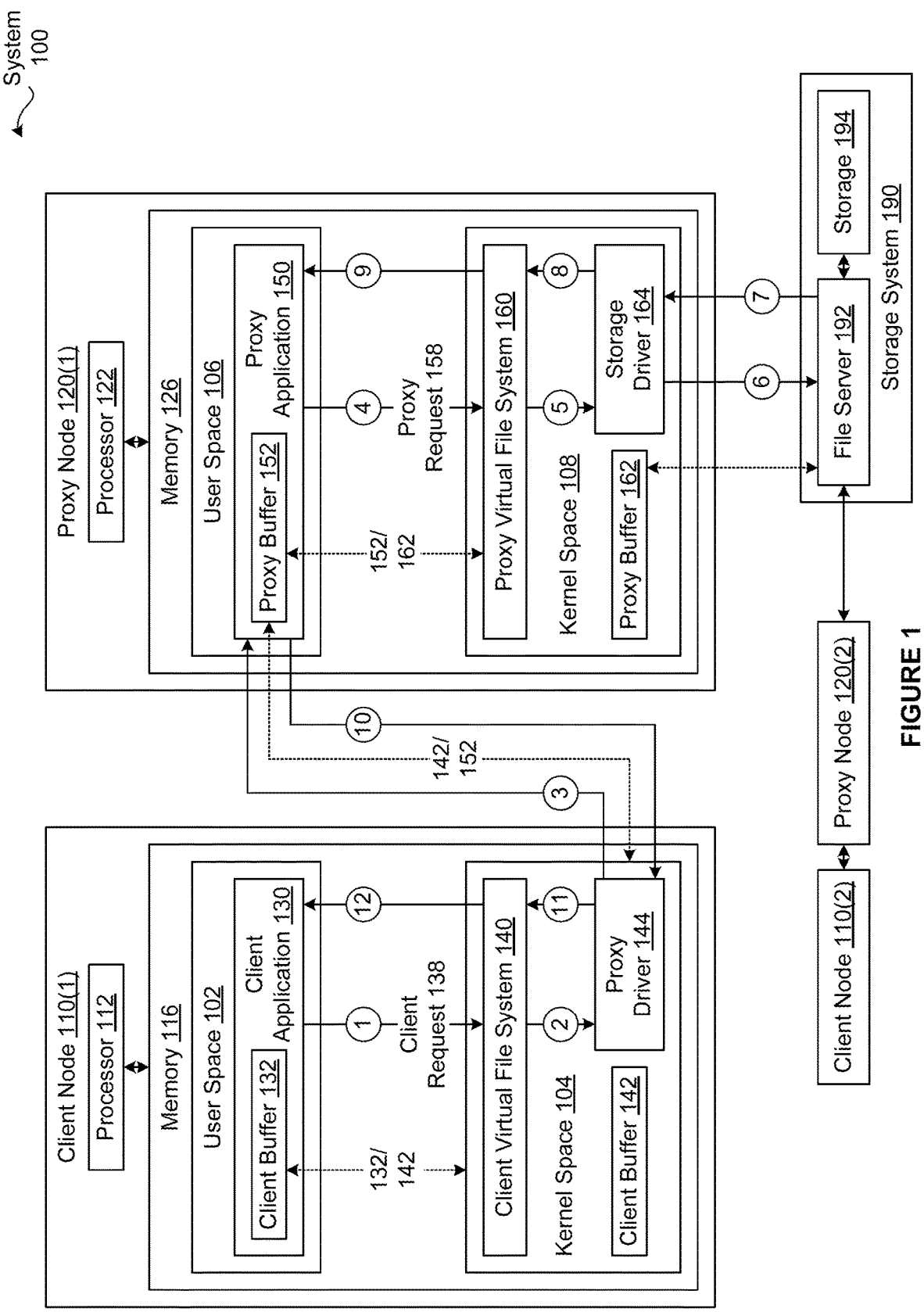
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a client node 110(1), a client node 110(2), a storage system 190, a proxy node 120(1), and a proxy node 120(2). In some other embodiments, the proxy node 120(2) can be omitted from the system 100. In the same other embodiments, the system 100 can further include, without limitation, one or more other client nodes, one or more other proxy nodes, any number and/or types of other compute nodes, any number and/or types of other storage systems, or any combination thereof.

The components of the system 100 can be distributed across any number of shared geographic locations and/or any number of different geographic locations and/or implemented in one or more cloud computing environments (i.e., encapsulated shared resources, software, data, etc.) in any combination. In some embodiments, the system 100 is at least a portion of a data center.

The client node 110(1), the client node 110(2), and zero or more other client nodes are compute nodes that execute applications associated with different clients. In some embodiments, a compute node can be any type of device that includes, without limitation, at least one processor, at least one memory, and is not directly controlled by any other compute node. Each compute node can be implemented in a cloud computing environment, implemented as part of any other distributed computing environment, or implemented in a stand-alone fashion. Any number of compute nodes can provide a multiprocessing environment in any technically feasible fashion.

A processor of a compute node can be any instruction execution system, apparatus, or device capable of executing instructions. For example, a processor of a compute node could comprise a central processing unit (CPU), a graphics processing unit (GPU), a data processing unit (DPU), a controller, a micro-controller, a state machine, or any combination thereof. A memory of a compute node stores content, such as software applications and data, for use by at least one processor of the compute node. A memory of a compute node can be one or more of a readily available memory, such as random-access memory, read only memory, floppy disk, hard disk, or any other form of digital storage, local or remote.

In some embodiments, a storage (not shown) may supplement or replace one or more memories of a compute node. The storage of a compute node may include any number and type of external memories that are accessible to at least one processor of the compute node. For example, and without limitation, the storage can include a Secure Digital Card, an external Flash memory, a portable compact disc read-only memory, an optical storage device, a magnetic storage device, or any suitable combination of the foregoing.

In some embodiments, a storage (not shown) that is accessible to the processor of a compute node may supplement or replace the memory of a compute node. The storage may include any number and type of external memories that are accessible to the processor of the compute node. For example, and without limitation, the storage can include a Secure Digital Card, an external Flash memory, a portable compact disc read-only memory, an optical storage device, a magnetic storage device, or any suitable combination of the foregoing.

In general, each compute node is configured to implement one or more software applications. For explanatory purposes only, each software application is described as residing in the memory of a single compute node and executing on the processor of the same compute node. However, in some embodiments, the functionality of each software application can be distributed across any number of other software applications that reside in the memories of any number of compute nodes and execute on the processors of any number of compute nodes in any combination. Further, subsets of the functionality of multiple software applications can be consolidated into a single software application.

The storage system 190 can be any type of file system that is associated with any number and/or types of file servers and includes any amount and/or types of storage that is used to store data associated with multiple different clients. For instance, the storage system 190 can be a local file system, a remote file system, a cloud-based file system, any type of distributed file system (e.g., a parallel file system), or any combination thereof.

As shown, in some embodiments, the storage system 190 includes, without limitation, a file server 192 and storage 194. The file server 192 can be any type of server that is used to access the storage 194. In the same or other embodiments, the file server 192 is not included in the storage system 190 but is used to access the storage 194 in any technically feasible fashion (and therefore is associated with the storage system 190). The file server 192 can implement any number and/or types of network file sharing protocols (e.g., Network File System).

The storage 194 can include any number and/or types of persistent storage resources that can be shared across any number of different clients. For instance, in some embodiments, the storage 194 includes any amount (including none) of shared file storage, any amount (including none) of shared block storage, and any amount (including none) of other types of storage (e.g., object storage). An example of a storage system that includes object storage is Amazon Simple Storage Service. In particular, the storage 194 is shared across at least a first client associated with the client node 110(1) and a second client associated with the client node 110(2).

As described previously herein, in one conventional approach to sharing storage resources across different clients, a file server performs operations on the storage included within a shared storage system in response to requests received from operating systems executing on different client nodes. After performing the operations specified in a given request, the file server transmits a response back to the operating system that transmitted the request.

One drawback of the above approach is that security measures oftentimes are implemented on the different client nodes accessing the shared storage system. The client nodes are vulnerable to various types of on-line attacks that can compromise those security measures. Once the security measures of a client node are compromised, the operating system executing on the compromised client node can be used maliciously to read, modify, and/or delete data associated with any number of clients that use the shared storage system.

Interposing Proxy Node(s) Between Client Nodes and Shared Storage Systems

To address the above problems, in some embodiments, one or more proxy nodes are interposed between client nodes and the shared storage systems such that no client node directly accesses any shared storage system. Each proxy node is a type of compute node that interfaces with one or more shared storage systems on behalf of one or more client nodes but is not directly controlled by the operating system or any other software executing on any client node. Consequently, the ability of any nefarious types of software that ends up executing on a client node to compromise a shared storage system can be reduced. And because, relative to a client node, a proxy node can be less vulnerable to various types of on-line attacks, implementing proxy nodes can increase the overall security of data stored in a shared storage system.

Figure 3:
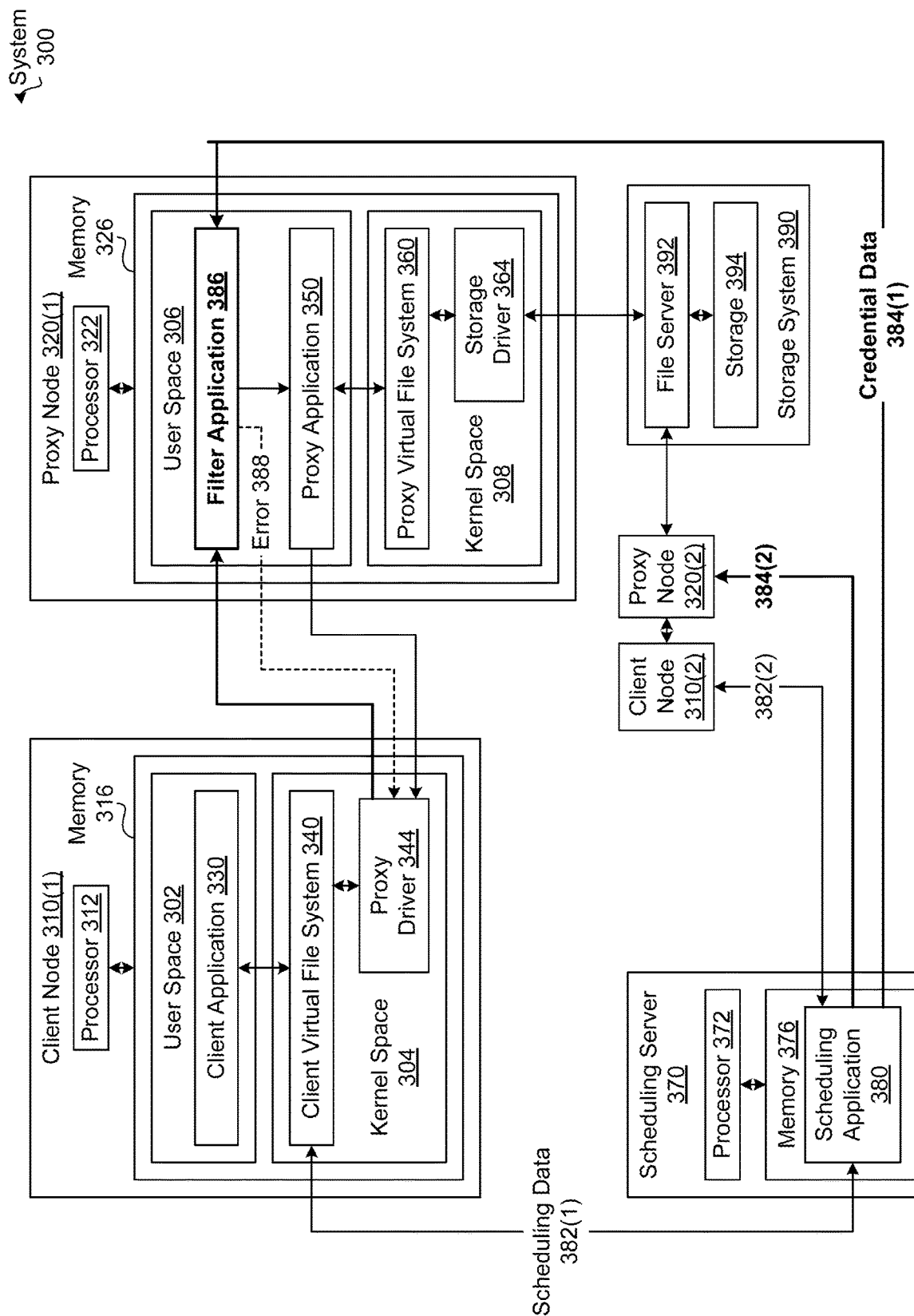
FIG. 3 is a conceptual illustration of a system configured to implement one or more aspects of other various embodiments.

For explanatory purposes, in various embodiments depicted in and described in conjunction with FIGS. 1 and 3, a different proxy node is interposed between each client node and the storage system 190. In the same or other embodiments, each client node is connected to the associated proxy node via Peripheral Component Interconnect Express (PCIe), and the processor included in each proxy node is a data processing unit (DPU). The file server 192, the client nodes, and the proxy nodes in the system 100 can implement any number and/or types of network file sharing protocols (e.g., Network File System).

As persons skilled in the art will recognize, the techniques described herein are illustrative rather than restrictive and can be altered and applied in other contexts without departing from the broader spirit and scope of the inventive concepts described herein. For example, the "proxy" techniques described herein in conjunction with FIGS. 1-4 can be modified and applied to move any number and/or types of operations associated with accessing any number and/or types of shared storage resources from a client node into a proxy node that is less vulnerable to on-line security threats.

In some other embodiments (not shown), each of one or more proxy nodes is a proxy server that is interposed between one or more client nodes and one or more storage systems, and the techniques described herein are modified accordingly. For instance, in some embodiments, a system includes a single proxy server that acts as an intermediary between each of multiple client nodes and the storage system 190. The proxy server can be connected to the file server 192 and to each client node via any number and/or types of network(s).

As shown, the client node 110(1) includes, without limitation, a client application 130, a client virtual file system 140, a proxy driver 144, and a client buffer 142. The client application 130 resides in a user space 102 within the memory 116 of the client node 110(1) and executes on the processor 112 of the client node 110(1). The client application 130 can issue any number and/or types of requests associated with the storage system 190. For explanatory purposes, a request that is issued by a client application and is associated with (e.g., targets) one or more locations within the storage system 190 is also referred to herein as a "client request." More specifically, each client request is a request for one or more operations to be performed at one or more specified location within the storage system 190.

For instance, in some embodiments, the processor 112 is a CPU, and the client application 130 issues a client request 138 that is a Portable Operating System Interface (POSIX) compliant system call, a Network File System system call, any other type of system call, a call to a function included in a POSIX compliant application programming interface (API), or any other type of function call. In some other embodiments, the processor 112 is a GPU, the client application 130 executes on the GPU, and the client request 138 is a system call that is issued directly by the client application 130. In yet other embodiments, the client application 130 generates the client request 138 based on a request (not shown) received from a function executing on a GPU that is included in or otherwise associated with the client node 110(1).

Some examples of types of operations that can be requested via a client request include a connection operation, a mount operation, a file write operation, a file read operation, a file open operation, a file close operation, a file creation operation, a file deletion operation, a directory listing operation, a directory creation operation, and a directory deletion operation. A client request can specify one or more location within the storage system 190 in any technically feasible fashion. For instance, a client request can specify an Internet Protocol (IP) address of the file server 192, a path name of a file within the shared storage 194, a file handle for an opened file within the shared storage 194, and a path name for a directory within the shared storage 194.

The client application 130 can allocate any number and/or types of buffers associated with any number and/or types of client requests in an any technically feasible fashion. As shown, in some embodiments, the client application 130 includes a client buffer 132 that is allocated for storage of data (e.g., data to be written to or read from the storage system 190) associated with the client request 138.

In some embodiments, when any software application executing on any client node issues a request that is associated with a location within a storage system, an operating system (not shown) automatically transmits the request to a virtual file system that is part of the operating system core associated with the client node. More specifically, the client application 130 causes the client virtual file system 140 to route the request to the proxy driver 144 based on a location within the storage system that is specified in the request.

As shown, the client virtual file system 140 and the proxy driver 144 reside in a kernel space 104 within the memory 116 of the client node 110(1) and execute on the processor 112 of the client node 110(1). The client virtual file system 140 is a virtual file system that is configured to automatically route requests that are associated with locations within the storage system 190 to the proxy driver 144. The client virtual file system 140 can be configured to automatically route requests that are associated with locations within the storage system 190 to the proxy driver 144 in any technically feasible fashion.

The proxy driver 144 forwards client requests received from software applications via the client virtual file system 140 to a proxy application 150 that executes on the proxy node 120(1). In a complementary fashion, the proxy driver 144 forwards corresponding client responses received from the proxy application 150 to the associated software applications via the client virtual file system 140. The proxy driver 144 and the proxy application 150 can communicate in any technically feasible fashion. For instance, in some embodiments, the proxy driver 144 and the proxy application 150 communicate via one or more queues.

As used herein, "forwarding" a client request to the proxy application 150 refers to performing any number and/or types of operations to enable the proxy application 150 to process the client request. For instance, in some embodiments, to forward a client request to the proxy application 150, the proxy driver 144 copies data stored in an associated client buffer that resides in the user space 102 to a client buffer that resides in the kernel space 104. The proxy driver 144 then transmits data describing the client request and the location of the associated client buffer to the proxy application 150 via one or more queues (not shown).

In some embodiments, a client response can include any amount and/or types of data transmitted from the proxy application 150 via one or more queues and/or any amount and/or types of data (e.g., data read from the storage 194) written to an associated client buffer by the proxy application 150. As used herein, "forwarding" a client response received from the proxy application 150 to an associated software application refers to performing any number and/or types of operations to enable the software application to process the client response.

For instance, in some embodiments, to forward a client response to an associated client application, the proxy driver 144 copies data stored in the associated client buffer that resides in the kernel space 104 to an associated client buffer that resides in the user space 104. The proxy driver 144 generates a forwarded client response based on the client response and transmits the forwarded client response to the associated client application via the client virtual file system 140.

In some embodiments, the proxy driver 144 is a type of kernel module known as "virtiofs" that implements a driver for a virtio-fs device, and a proxy application 150 that executes on the proxy node 120(1) is a type of shared file system daemon known as "virtiofsd" that implements a virtio-fs device for file system sharing. Virtiofs and virtiofsd are part of a shared file system protocol that is designed to provide local file system semantics between multiple virtual machines sharing a directory tree and is based on a File System in User Space (FUSE) userspace filesystem framework. Techniques for implementing and using virtiofs, virtiofsd, and FUSE are well-known in the art. Please see https://virtiofs.gitlab.io/, https://virtiofs.gitlab.io/, and https://en.wikipedia.org/wiki/Filesystem_in_Userspace.

In some other embodiments, the proxy driver 144 can forward user requests to the proxy application 150 in accordance with FUSE or any other type of userspace filesystem framework and/or in accordance with any other type of shared file system protocol. For instance, in some embodiments, the proxy driver 144 executes in the user space 102 instead of the kernel space 104. In the same or other embodiments, the proxy driver 144 forwards client requests from the user space 102 to the proxy application 150 in accordance with a proprietary shared file system protocol, and the proxy application 150 processes client requests in accordance with the proprietary shared file system protocol.

As shown, the proxy node 120(1) includes, without limitation, the proxy application 150, a proxy virtual file system 160 and a storage driver 164. The proxy application 150 resides in a user space 106 within the memory 126 of the proxy node 120(1) and executes on the processor 122 of the proxy node 120(1). The proxy application 150 converts forwarded client requests received from the proxy driver 144 to proxy requests and transmits the proxy requests to the storage driver 162 via the proxy virtual file system 160. In a complementary fashion, the proxy application 150 converts proxy responses received from the storage driver 162 via the proxy virtual file system 160 to client responses, and transmits the client responses to the proxy driver 144.

Each forwarded client request is associated with one or more locations within the storage system 190 and a client buffer that resides in the kernel space 104. Upon receiving a forwarded client request, the proxy application 150 copies data from the associated client buffer to a proxy buffer that resides in the user space 106. The proxy application 150 then reconstructs the original client request corresponds to the forwarded client request with the exception that the forwarded client request is associated with the proxy buffer instead of the client buffer. The proxy application 150 then invokes or executes the proxy request to cause the proxy request to be automatically transmitted to the proxy virtual file system 160.

Each proxy response is associated with a proxy buffer that resides in a kernel space 108 within the memory 126 of the proxy node 120(1). Upon receiving a proxy response, the proxy application 150 copies data from the associated proxy buffer to a corresponding proxy buffer that resides in the user space 106. The proxy application 150 converts the proxy response to a client response that is associated with same client buffer as the corresponding forwarded client request instead of the proxy buffer.

As used herein, "converting a proxy response to a client response' refers to performing any number and/or types of operations to enable the proxy driver 144 to process the client response. In some embodiments, to convert a proxy response to a client response, the proxy application 150 copies data from the associated proxy buffer to the client buffer associated with the corresponding forwarded client request. The proxy application 150 transmits data describing the client request and the location of the associated client buffer to the proxy driver 144 in any technically feasible fashion (e.g., via one or more queues).

As shown, the proxy virtual file system 160 and the storage driver reside in the kernel space 108 within the memory 126 of the proxy node 120(1) and execute on the processor 122 of the proxy node 120(1). The proxy virtual file system 160 is a virtual file system that is configured to automatically route requests that are associated with locations within the storage system 190 to the storage driver 164. The proxy virtual file system 160 can be configured to automatically route requests that are associated with locations within the storage system 190 to the storage driver 164 in any technically feasible fashion.

The storage driver 164 is a version of a driver associated with the file server 192 that is compatible with the processor 122. The storage driver 164 forwards proxy requests received from the proxy application 150 via the proxy virtual file system 160 to the file server 192. In a complementary fashion, the storage driver 164 forwards proxy responses received from the file server 192 to the proxy application 150 via the proxy virtual file system 160.

As used herein "forwarding a proxy request" includes executing any number and/or types of operations to enable the file server 192 to fulfill the proxy requests. In particular, the storage driver 164 can collaborate with the file server 192 to establish a connection between the proxy node 120(1) and the file server 192, authorize a mount of a directory corresponding to a location within the storage system 190 to the proxy node 120(1), and translate from file references (e.g., <file handle, offset, size>) to underlying references (e.g., blocks).

For explanatory purposes, FIG. 1 depicts a series of circles numbered 1-12 that correspond to a sequence of exemplary events associated with fulfilling the client request 138 that is associated with a first location within the storage system 190 and the client buffer 132. In some embodiments, during an initialization phase that occurs prior t the sequence of exemplary events, the client application 130 issues a "connection" client request to connect to the file server 192 and a "mount" client request to map the IP address of the file server 192 filer into a mount point in a local file system of the client node 110(1). Notably, the file server 192 establishes the connection and authorizes the mount.

As depicted with a circle numbered 1, when the client application 130 issues the client request 138, an operating system executing on the client node 110(1) automatically transmits the client request 138 to the client virtual file system 140. When the client application 130 issues the client request 138, the client application 130 causes the client virtual file system 140 to route the client request 138 to the proxy driver 144 based on a location specified in the client request 138. As depicted with a circle numbered 2, the client virtual file system 140 routes the client request 138 to the proxy driver 144 based on one or more of a path name, a file handle, or an IP address included in the client request 138.

As shown, the proxy driver 144 forwards the client request 138 to the proxy application 150. In some embodiments, as depicted with a dashed line labeled 132/142, the proxy application 150 copies the data stored in the client buffer 132 to a client buffer 142 included in the kernel space 104. As depicted with a circle numbered 3, the proxy driver 144 transmits data describing the client request 138 and the location of the client buffer 142 to the proxy application 150 via one or more queues.

In some other embodiments, the client application 130 and/or the proxy driver 144 can implement any number and/or types of memory management techniques to omit the client buffer 142. For instance, in some embodiments, the use of page cache can be disabled for the proxy driver 144 (e.g., by opening the file in "O_DIRECT mode"), the client buffer 132 is pinned, and data is transferred between the client buffer 132 and the proxy buffer 152 via direct memory access (DMA). As used herein, "pinned" memory refers to a part of a virtual address space that is locked to a part of a corresponding physical space and cannot be paged out.

As shown, the proxy application 150 converts the forwarded client request to a proxy request 158 that is associated with a proxy buffer 152 that resides in the user space 106. As depicted with a dashed line labeled 142/152, the proxy application 150 copies data stored in the client buffer 142 to the proxy buffer 152. As depicted with a circle numbered 4, the proxy application 150 issues the proxy request 158 and, in response, the operating system automatically transmits the proxy request 158 to the proxy virtual file system 160. As depicted with a circle numbered 5, the proxy virtual file system 160 routes the proxy request 158 to the storage driver 164 based on one or more of a path name, a file handle, or an IP address included in the proxy request 158.

As depicted with a circle numbered 6, the storage driver 164 causes the file server 192 to perform one or more operations on the storage 194 in accordance with the proxy request 158. As depicted with circles numbered 7-9, the file server 192 transmits a proxy response to the proxy application 150 via the storage driver 164 and the proxy virtual file system 160.

The proxy application 150 converts the proxy response to a client response. As depicted with a dashed line labeled 142/152, the proxy application 150 copies data stored in the proxy buffer 152 to the client buffer 142. As depicted with a circle numbered 10, the proxy application 150 transmits the client response to the proxy driver 144.

As depicted with a dashed line labeled 132/142, the proxy driver 144 copies data from the client buffer 142 to the client buffer 132. As depicted with the circles numbered 11-12, the proxy driver 144 forwards the client response to the client application 130 via the client virtual file system 140.

As persons skilled in the art will recognize, the techniques described are illustrative rather than restrictive and can be altered without departing from the broader spirit and scope of the invention. Many modifications and variations on the functionality of the client application 130, the client virtual file system 140, the proxy driver 144, the proxy application 150, the proxy virtual file system 160, the storage driver 164, and the file server 192 as described herein will be apparent to those of ordinary skill in the art without departing from the scope and spirit of the described embodiments. Further, in various embodiments, any number of the techniques disclosed herein may be implemented while other techniques may be omitted in any technically feasible fashion. Similarly, many modifications and variations on the client requests, the forwarded client requests, the proxy requests, the proxy responses, the client responses, and the forwarded client responses will be apparent to those of ordinary skill in the art without departing from the scope and spirit of the described embodiments.

It will be appreciated that the system 100 shown herein is illustrative and that variations and modifications are possible. For example, in some embodiments, any portions (including all) of the functionality provided by the client application 130, the client virtual file system 140, the proxy driver 144, the proxy application 150, the storage driver 164, and the file server 192 can be integrated into or distributed across any number of software applications (including one). Further, the connection topology between the various units in FIG. 1 can be modified as desired.

Figure 2:
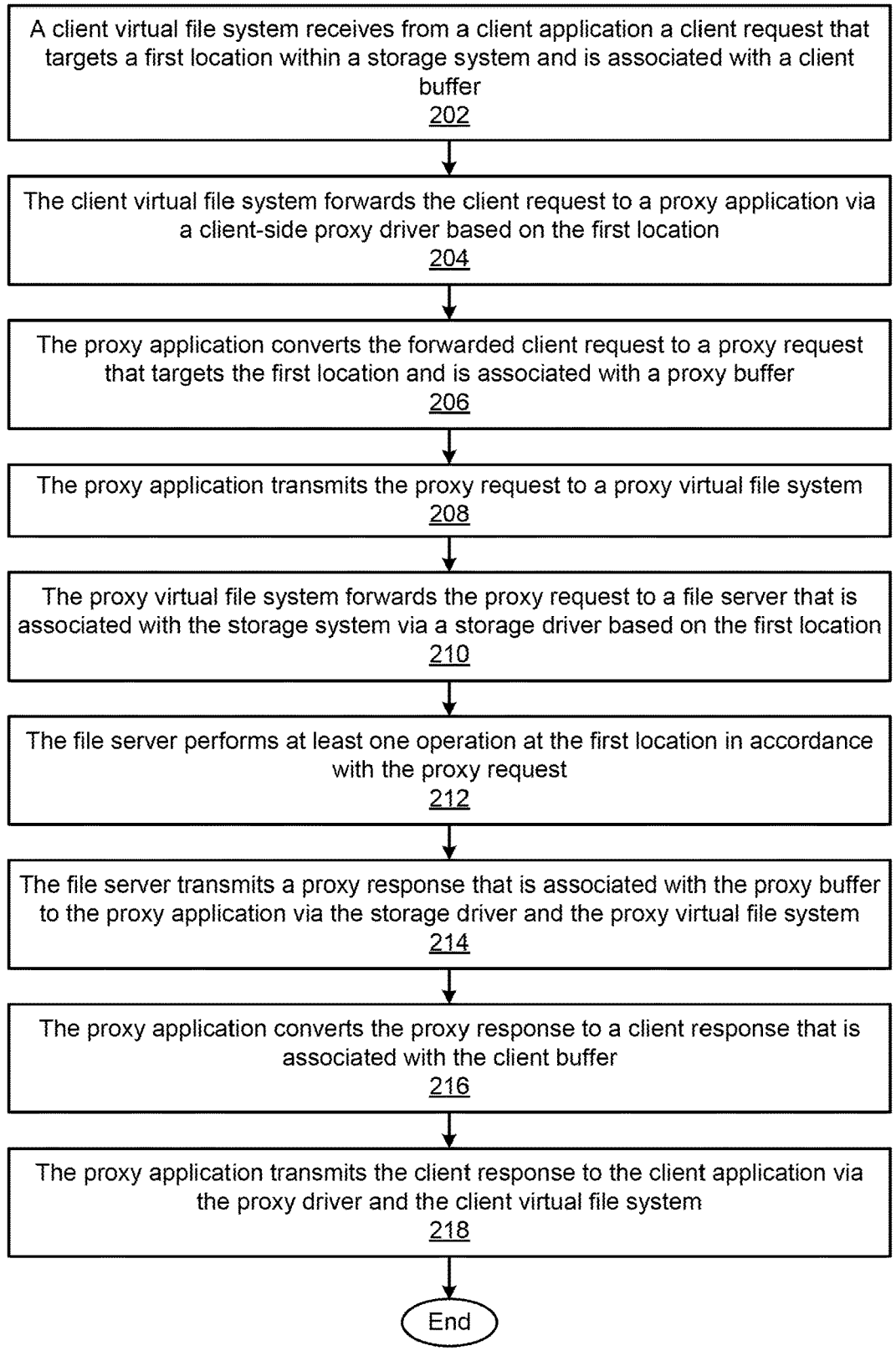
FIG. 2 is a flow diagram of method steps for processing a request to access one or more locations within a storage system, according to various embodiments.

FIG. 2 is a flow diagram of method steps for processing a request to access one or more locations within a storage system, according to various embodiments. Although the method steps are described with reference to the system of FIG. 1, persons skilled in the art will understand that any system configured to implement the method steps, in any order, falls within the scope of the embodiments.

As shown, a method 200 begins at step 202, where the client virtual file system 140 receives from the client application 130 a client request that targets a first location within the storage system 190 and is associated with a client buffer. At step 204, the client virtual file system 140 forwards the client request to the proxy application 150 via the proxy driver 144 based on the first location.

At step 206, the proxy application 150 converts the forwarded client request to a proxy request that targets the first location and is associated with a proxy buffer. At step 208, the proxy application 150 transmits the proxy request to the proxy virtual file system 160. At step 210, the proxy virtual file system 160 forwards the proxy request to the file server 192 that is associated with the storage system 190 via the storage driver 164 based on the first location.

At step 212, the file server 192 performs at least one operation at the first location in accordance with the proxy request. At step 214, the file server 192 transmits a proxy response that is associated with the proxy buffer to the proxy application 150 via the storage driver 164 and the proxy virtual file system 160.

At step 216, the proxy application 150 converts the proxy response to a client response that is associated with the client buffer. At step 218, the proxy application 150 transmits the client response to the client application 130 via the proxy driver 144 and the client virtual file system 140. The method 200 then terminates.

Advantageously, with the disclosed "proxy" techniques described previously herein in conjunction with FIGS. 1 and 2, client nodes are able to access shared storage indirectly via one or more proxy nodes that are less vulnerable to on-line security attacks relative to the client nodes. Consequently, to the extent malware or other nefarious types of software ends up executing on a client node, the malware or nefarious software is less able to circumvent security mechanisms and/or operational restrictions implemented by the proxy node(s) associated with the client node.

Filtering-Out Shared Storage Requests Based on Credential Data from a Scheduling Application As persons skilled in the art will recognize, however, a proxy node can still receive requests to access shared storage that are initiated by malware or other nefarious types of software executing on a client node. For this reason, in some embodiments, a filter application 386 is used to filter-out requests to access shared storage based on credential data provided by a scheduling server 370.

The credential data specifies a different set of one or more user identifiers (IDs) corresponding to one or more users for each of any number of node identifiers (IDs) corresponding to any number of nodes. The set of user IDs associated with a given node ID correspond to a set of users that are authorized to run jobs on the client node corresponding to the given node ID. The credential data can be organized in any technically feasible fashion. For instance, in some embodiments, the credential data includes one or more authorization mappings, where each authorization mapping specifies a node identifier and a set of one or more user identifiers.

For explanatory purposes, in embodiments depicted in and described in conjunction with FIG. 3, a proxy node is interposed between a different client node and the file server 192 and a different instance of a filter application 386 executes on each proxy node. More specifically, a different instance of the filter application 386 resides within the user space of the memory of each proxy node and executes on the processor of each proxy node. Further, the scheduling server 370 transmits credential data to proxy nodes and scheduling data to client nodes As persons skilled in the art will recognize, the techniques described herein are illustrative rather than restrictive and can be altered and applied in other contexts without departing from the broader spirit and scope of the inventive concepts described herein. For example, as noted previously herein, the "proxy" techniques described herein in conjunction with FIGS. 1-4 can be modified and applied to move any number and/or types of operations associated with accessing any type of shared storage from a client node into a proxy node that is less vulnerable to on-line security attacks.

Figure 4:
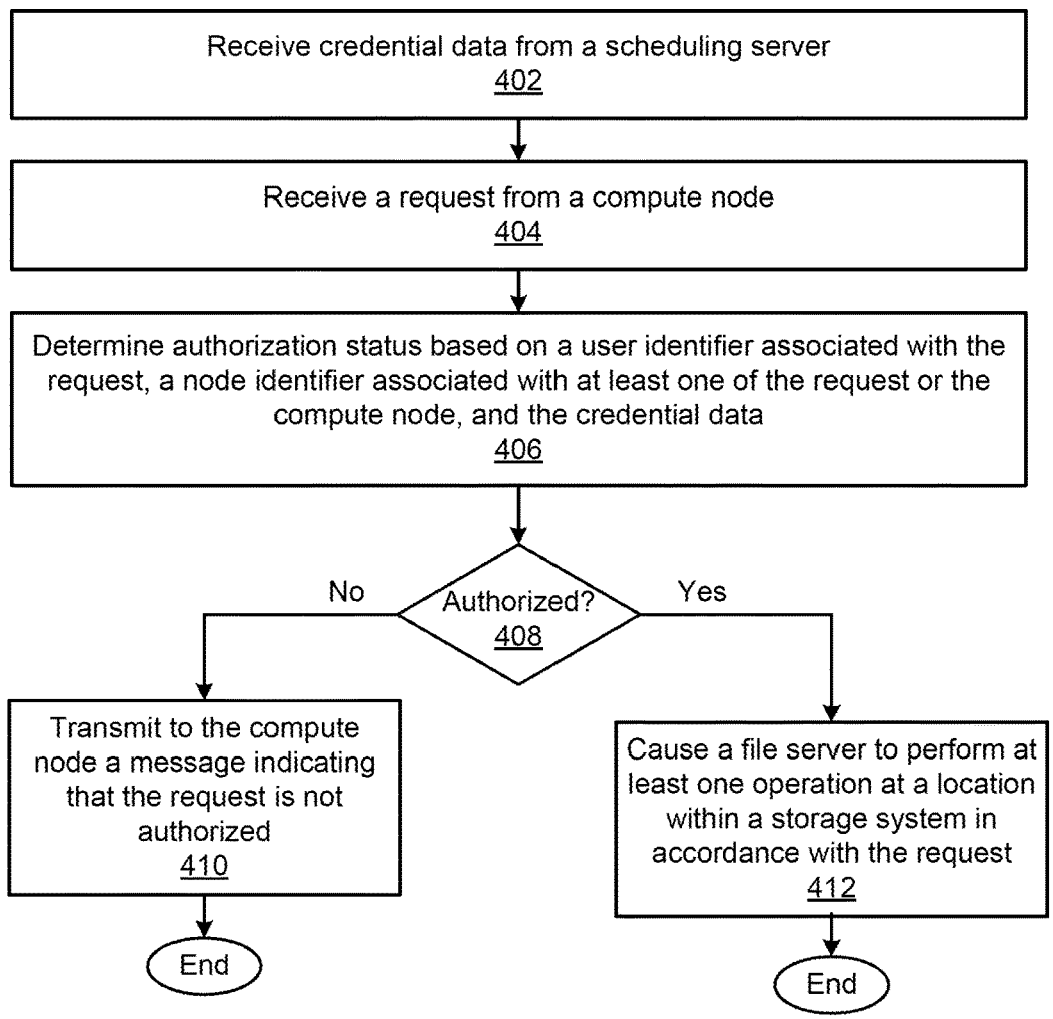
FIG. 4 is a flow diagram of method steps for filtering a request to access one or more locations within a storage system, according to various embodiments.

In another example, the "filtering" techniques described herein in conjunction with FIGS. 3 and 4 can be modified and applied to identify and filter-out requests that are originally initiated by client applications executing on one or more associated client nodes and are associated with accessing any type of shared storage based on credential data received from any type of scheduling server. For instance, in some embodiments, the filter application 386 resides within the kernel space instead of the user space of the memory of each proxy node. In some other embodiments, the filter application 386 executes on one or more proxy servers that are each deployed between multiple client nodes and one or more storage systems. In yet other embodiments, the filter application 386 executes on a compute node that is interposed between the proxy node(s) and the file server 392.

In yet another example, the distribution of credential data and scheduling data described herein in conjunction with FIGS. 3 and 4, can be modified and applied distribution any amounts and/or types of credential data, scheduling data, or any combination thereof to proxy nodes, client nodes, and any other compute nodes. For instance, in some embodiments, the scheduling application 380 can transmit both credential data and scheduling data to both proxy nodes and client nodes. In yet other embodiments, the scheduling application 380 can transmit both credential data and scheduling data to proxy nodes, and the filtering application or the proxy application forwards the scheduling data to the appropriate client nodes.

FIG. 3 is a conceptual illustration of a system 300 configured to implement one or more aspects of other various embodiments. As shown, the system 300 includes, without limitation, the scheduling server 370, a storage system 390, a client node 310(1), a client node 310(2), a proxy node 320(1), and a proxy node 320(2. In some other embodiments, the proxy node 120(2) can be omitted from the system 100. In the same other embodiments, the system 100 can further include, without limitation, one or more other client nodes, one or more other proxy nodes, any number and/or types of other compute nodes, any number and/or types of other storage systems, or any combination thereof.

The components of the system 100 can be distributed across any number of shared geographic locations and/or any number of different geographic locations and/or implemented in one or more cloud computing environments (i.e., encapsulated shared resources, software, data, etc.) in any combination. In some embodiments, the system 100 is at least a portion of a data center.

The system 300 is a modified version of the system 100 described previously herein, where the modifications are limited to adding the scheduling server 370 to the system 300 and implementing the filter application 386 within the system 300. As shown, the storage system 390 includes a file server 392 and storage 394. The file server 392 is used to access the storage 394. Referring back to FIG. 1, the functionalities of the storage system 390, the file server 392, and the storage 394 are the same as the storage system 190, the file server 192, and the storage 194. The proxy node 320(1) is interposed between the client node 310(1) and the file server 392. The proxy node 320(2) is interposed between the client node 310(2) and the file server 392.

The scheduling server 370 can be any type of compute node that manages one or more aspects of scheduling jobs across different client nodes, where each job is associated with one or more users. For instance, some embodiments, the scheduling server 370 is a job scheduler in a data center. In some other embodiments, the scheduling server 370 is a container orchestrator. As shown, the scheduling server 370 includes, without limitation, a processor 372 and a memory 376. A scheduling application 380 resides in the memory 376 and executes on the processor 372.

As shown, the scheduling application 380 transmits scheduling data 382(1) to the client node 310(1), scheduling data 382(1) to the client node 310(2), credential data 384(1) to the proxy node 320(1), and credential data 384(2) to the proxy node 320(2). The scheduling data 382(1) includes any amount and/or types of scheduling data associated with the client node 310(1). The scheduling data 382(2) includes any amount and/or types of scheduling data associated with the client node 310(2). The credential data 384(1) includes, without limitation, an authorization mapping associated with the client node 310(1). The credential data 384(2) includes, without limitation, an authorization mapping associated with the client node 310(2).

The scheduling server 370 generates and/or updates the authorization mapping associated with a given client node whenever a new job starts up on the client node. In some embodiments, the authorized user(s) associated with a job can change during the execution of the job, and the scheduling server 370 updates the associated authorization mapping accordingly.

In some embodiments, the scheduling server 370 directly communicates with each proxy node in any technically feasible fashion. For instance, in some embodiments, the scheduling server 370 communicates with the proxy node 320(1) and the proxy node 320(2) using, without limitation, Representational State Transfer APIs, Kubernetes custom resource definitions, Remote Procedure Calls, microservices, or any combination thereof. In some other embodiments, the scheduling server 370 indirectly communicates with each proxy node based on a target IP address corresponding to the proxy node via any type of interface and/or in accordance with any number and/or types of protocols that are also used to communicate scheduling data with the associated client node.

As shown, the client node 310(1) includes, without limitation, a processor 312 and a memory 316. A client application 330 resides within a user space 302 in the memory 316 and executes on the processor 312. The functionality of the client application 330 is the same as the functionality of the client application 130 described previously herein in conjunction with FIG. 1. A client virtual file system 340 and a proxy driver 344 reside within a kernel space 304 in the memory 316 and execute on the processor 312. The functionality of the client virtual file system 340 is the same as the functionality of the client virtual file system 140 described previously herein in conjunction with FIG. 1. The proxy driver 344 is a version of the proxy driver 144 (described previously herein in conjunction with FIG. 1) that is modified to transmit forwarded client requests to the filter application 386 instead of directly to the proxy application 350.

As shown, the proxy node 320(1) includes, without limitation, a processor 322 and a memory 326. The filter application 386 and the proxy application 350 reside within a user space 306 in the memory 326 and execute on the processor 322. As shown, upon receiving a forwarded client request from the proxy driver 344, the filter application 386 determines whether the forwarded client request is authorized based on a "request" user ID, a "request" node ID, and credential data 384(1) The request user ID is associated with the forwarded client request. The request node ID is associated with at least one of the forwarded client request or the client node 310(1).

If, no authorization mapping included in the credential data 384(1) includes both the request user ID and the request node ID, then the filter application 386 determines that the forwarded client request is not authorized and does not relay the forwarded client request to the proxy application 150. Instead, as depicted via a dashed arrow, the filter application 386 transmits an error 388 to the proxy driver 344. The error 388 is a proxy response indicating that the forwarded client request is not authorized.

If, however, any authorization mapping included in the credential data 384(1) includes both the request user ID and the request node ID, then the filter application 386 determines that the forwarded client request is authorized, and the filter application 386 relays the forwarded client request to the proxy application 350. The proxy application 350 is a version of the proxy application 150 (described previously herein in conjunction with FIG. 1) that is modified to receive forwarded client requests from the filter application 386 instead of directly from the proxy driver 344.

As shown, a proxy virtual file system 360 and a storage driver 364 reside within a kernel space 308 in the memory 326 and execute on the processor 322. The functionality of the proxy virtual file system 360 is the same as the functionality of the proxy virtual file system 160 described previously herein in conjunction with FIG. 1. The functionality of the storage driver 364 is the same as the functionality of the storage driver 164 described previously herein in conjunction with FIG. 1.

As persons skilled in the art will recognize, the techniques described are illustrative rather than restrictive and can be altered without departing from the broader spirit and scope of the invention. Many modifications and variations on the functionality of the provided by the client application 330, the client virtual file system 340, the proxy driver 344, the filter application 386, the proxy application 350, the storage driver 364, the file server 392, and the scheduling application 380 as described herein will be apparent to those of ordinary skill in the art without departing from the scope and spirit of the described embodiments. Further, in various embodiments, any number of the techniques disclosed herein may be implemented while other techniques may be omitted in any technically feasible fashion. Similarly, many modifications and variations on the credential data, the scheduling data, the client requests, the forwarded client requests, the proxy requests, the proxy responses, the client responses, and the forwarded client responses will be apparent to those of ordinary skill in the art without departing from the scope and spirit of the described embodiments.

It will be appreciated that the system 300 shown herein is illustrative and that variations and modifications are possible. For example, in some embodiments, any portions (including all) of the functionality provided by the client application 330, the client virtual file system 340, the proxy driver 344, the filter application 386, the proxy application 350, the storage driver 364, the file server 392, and the scheduling application 380 can be integrated into or distributed across any number of software applications (including one). In particular, in some embodiments, the functionality provided by the filter application 386 as described herein is integrated into the proxy application 350. Further, the connection topology between the various units in FIG. 1 can be modified as desired.

FIG. 4 is a flow diagram of method steps for filtering a request to access one or more locations within a storage system, according to various embodiments. Although the method steps are described with reference to the system of FIG. 3, persons skilled in the art will understand that any system configured to implement the method steps, in any order, falls within the scope of the embodiments.

As shown, a method 400 begins at step 402, where the filter application 386 receives credential data from the scheduling server 370. At step 404, the filter application 386 receives a request from a compute node (e.g., a client node). At step 406, the filter application 386 determines an authorization status based on a user identifier associated with the request, a node identifier associated with at least one of the compute node or the request, and the credential data.

At step 408, the filter application 386 determines whether the request is authorized. If, at step 408, the filter application 386 determines that the request is not authorized, then the method 400 proceeds to step 410. At step 410, the filter application 386 transmits to the compute node a message indicating that the request is not authorized. The method 400 then terminates.

If, however, at step 408, the filter application 386 determines that the request is authorized, then the method 400 proceeds directly to step 412. At step 412, the filter application 386 causes the file server 392 to perform at least one operation at the location within the storage system 390 in accordance with the request. The method 400 then terminates.

As described previously herein in conjunction with FIG. 2, in some embodiments, a different instance of the filter application 386 executes on each of one or more proxy node, where each proxy node is associated with a different client node. In some other embodiments, the filter application 386 executes on a proxy server (not shown) and can receive requests from any number of different client nodes. In yet other embodiments, the filter application 386 executes on a compute node (e.g., the file server 392) included in the storage system 390.

In sum, the disclosed techniques can be used to reduce security risks when multiple client nodes share storage. In some embodiments, any number of client nodes indirectly access a storage system via associated DPUs. The storage system includes any amount and/or types of shared storage and a file server that controls access to the shared storage. Each client node is associated with a different DPU that acts as a proxy for the file server. A scheduling server transmits scheduling data to the client nodes and credential data to the DPUs. The credential data includes any number of authorization mappings, where each authorization mapping specifies a node identifier associated with a client node and one or more user identifiers associated with one or more users that are authorized to execute jobs on the client node. One or more client applications execute in the user space of each client node. A client virtual file system and a proxy driver execute in the kernel space of each client node. A filter application and a proxy application execute in the user space of each DPU. A proxy virtual file system and a storage driver execute in the kernel space of each DPU.

The client virtual file system is configured to automatically route client requests that target locations within the storage system to the proxy driver. Upon receiving a client request, the proxy driver ensures that a client buffer associated with the client request is accessible by the associated DPU and then forwards the client request to the filter application executing on the associated DPU. The filter application determines whether the forwarded client request is authorized based on the credential data, a user identifier associated with the client request, and a node identifier associated with the client node. If the filter application determines that the forwarded client request is not authorized, then the filter application transmits to the associated client application (via the proxy driver and the client virtual file system) a response indicating that the client request is not authorized. Otherwise, the filter application relays the forwarded client request to the proxy application.

The proxy application converts the forwarded client request to a proxy request that is associated with a proxy buffer. As part of converting the client request to the proxy request, the proxy application performs any number and/or types of operations to copy data from the client buffer to the proxy buffer. The proxy application transmits the proxy request to the proxy virtual file system. The proxy virtual file system is configured to automatically route proxy requests that target locations within the storage system to the storage driver. The storage driver forwards the proxy request to the file server.

The file server performs any number and/or types of operations at the location(s) within the storage system that are associated with the proxy request to generate a proxy response that is associated with the proxy buffer. The file server transmits the proxy response to the storage driver. The storage driver forward the proxy response to the proxy application (via the proxy virtual file system). The proxy application converts the proxy response to a client response that is associated with the client buffer. The proxy application transmits the proxy response to the proxy driver. The proxy driver performs any number and/or types of operations to copy any output data from the proxy buffer to the client buffer. The proxy driver forwards the proxy response to the client application (via the client virtual file system).

At least one technical advantage of the disclosed techniques relative to the prior art is that, with the disclosed techniques, client nodes are able to access shared storage indirectly via one or more proxy nodes that are less vulnerable to on-line security attacks relative to the client nodes. In that regard, with the disclosed techniques, the proxy nodes are not directly controlled by the operating systems or any of the other software executing on the client nodes. Consequently, to the extent malware or other nefarious types of software ends up executing on a client node, the malware or nefarious software is less able to circumvent security mechanisms and/or operational restrictions implemented by the proxy node(s) associated with the client node. These technical advantages provide one or more technological improvements over prior art approaches.

1. In some embodiments, a computer-implemented method for processing requests to access a storage system comprises receiving a first request from a first proxy driver executing on a first client node, wherein the first request is associated with a first client buffer and a first location within the storage system; converting the first request to a second request that is associated with a first proxy buffer and the first location within the storage system; and transmitting the second request to a storage driver that is associated with the storage system, wherein the storage driver causes a file server to perform at least one operation at the first location in accordance with the second request.

2. The computer-implemented method of clause 1, wherein converting the first request to the second request comprises copying data from the first client buffer to the first proxy buffer.

3. The computer-implemented method of clauses 1 or 2, further comprising receiving a third request from a second proxy driver executing on a second client node, wherein the third request is associated with a second client buffer and a second location within the storage system; converting the third request to a fourth request that is associated with a second proxy buffer and the second location within the storage system; and transmitting the third request to the storage driver, wherein the storage driver causes the file server to perform at least one operation at the second location in accordance with the fourth request.

4. The computer-implemented method of any of clauses 1-3, wherein transmitting the second request to the storage driver comprises causing a virtual file system executing on a proxy node to route the second request to the storage driver based on at least one of a path name or a file handle that is included in the second request and corresponds to the first location.

5. The computer-implemented method of any of clauses 1-4, wherein the first proxy driver generates the first request based on a system call executed by a client application executing on the first client node.

6. The computer-implemented method of any of clauses 1-5, further comprising receiving a first response from the storage driver; converting the first response to a second response that is associated with the first client buffer; and transmitting the second response to the first proxy driver.

7. The computer-implemented method of any of clauses 1-6, wherein the first request is generated based on an original request issued by a client application executing on either a central processing unit included in the first client node or a graphics processing unit included in the first client node.

8. The computer-implemented method of any of clauses 1-7, wherein the storage driver executes on a data processing unit, and the first proxy buffer resides on the data processing unit.

9. The computer-implemented method of any of clauses 1-8, wherein the at least one operation either establishes a connection between the data processing unit and the file server or mounts a directory corresponding to the first location on the data processing unit.

10. The computer-implemented method of any of clauses 1-9, wherein the storage system comprises at least one of shared file storage, shared block storage, or object storage.

11. In some embodiments, one or more non-transitory computer readable media include instructions that, when executed by one or more processors, cause the one or more processors to process requests to access a storage system by performing the steps of receiving a first request from a first proxy driver executing on a first client node, wherein the first request is associated with a first client buffer and a first location within the storage system; converting the first request to a second request that is associated with a first proxy buffer and the first location within the storage system; and transmitting the second request to a storage driver that is associated with the storage system, wherein the storage driver causes a file server to perform at least one operation at the first location in accordance with the second request.

12. The one or more non-transitory computer readable media of clause 11, wherein converting the first request to the second request comprises copying data from the first client buffer to the first proxy buffer.

13. The one or more non-transitory computer readable media of clauses 11 or 12, further comprising receiving a third request from a second proxy driver executing on a second client node, wherein the third request is associated with a second client buffer and a second location within the storage system; converting the third request to a fourth request that is associated with a second proxy buffer and the second location within the storage system; and transmitting the third request to the storage driver, wherein the storage driver causes the file server to perform at least one operation at the second location in accordance with the fourth request.

14. The one or more non-transitory computer readable media of any of clauses 11-13, wherein transmitting the second request to the storage driver comprises causing a virtual file system executing on a proxy node to route the second request to the storage driver based on at least one of a path name or a file handle that is included in the second request and corresponds to the first location.

15. The one or more non-transitory computer readable media of any of clauses 11-14, wherein the at least one operation comprises a file write operation, a file read operation, a file open operation, a file close operation, a file creation operation, a file deletion operation, a directory listing operation, a directory creation operation, or a directory deletion operation.

16. The one or more non-transitory computer readable media of any of clauses 11-15, further comprising receiving a first response from the storage driver; and causing data associated with the first response to be copied from the first proxy buffer to the first client buffer.

17. The one or more non-transitory computer readable media of any of clauses 11-16, wherein the first request is generated based on an original request issued by a client application executing on either a central processing unit included in the first client node or a graphics processing unit included in the first client node.

18. The one or more non-transitory computer readable media of any of clauses 11-17, wherein the storage driver executes on a proxy server, and the first proxy buffer resides on the proxy server.

19. The one or more non-transitory computer readable media of any of clauses 11-18, wherein the at least one operation either establishes a connection between the proxy server and the file server or mounts a directory corresponding to the first location on the proxy server.

20. In some embodiments, a system comprises one or more memories storing instructions and one or more processors coupled to the one or more memories that, when executing the instructions, perform the steps of receiving a first request from a first proxy driver executing on a first client node, wherein the first request is associated with a first client buffer and a first location within a storage system; converting the first request to a second request that is associated with a first proxy buffer and the first location within the storage system; and transmitting the second request to a storage driver that is associated with the storage system, wherein the storage driver causes a file server to perform at least one operation at the first location in accordance with the second request.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing requests to access a storage system, the method comprising:
    receiving a first request from a first proxy driver executing on a first client node, wherein the first request is associated with a first client buffer and a first location within the storage system;
    converting the first request to a second request that is associated with a first proxy buffer and the first location within the storage system; and
    transmitting the second request to a storage driver that is associated with the storage system, wherein the storage driver causes a file server to perform at least one operation at the first location in accordance with the second request.

2. The computer-implemented method of claim 1, wherein converting the first request to the second request comprises copying data from the first client buffer to the first proxy buffer.

3. The computer-implemented method of claim 1, further comprising:
    receiving a third request from a second proxy driver executing on a second client node, wherein the third request is associated with a second client buffer and a second location within the storage system;
    converting the third request to a fourth request that is associated with a second proxy buffer and the second location within the storage system; and
    transmitting the third request to the storage driver, wherein the storage driver causes the file server to perform at least one operation at the second location in accordance with the fourth request.

4. The computer-implemented method of claim 1, wherein transmitting the second request to the storage driver comprises causing a virtual file system executing on a proxy node to route the second request to the storage driver based on at least one of a path name or a file handle that is included in the second request and corresponds to the first location.

5. The computer-implemented method of claim 1, wherein the first proxy driver generates the first request based on a system call executed by a client application executing on the first client node.

6. The computer-implemented method of claim 1, further comprising:
    receiving a first response from the storage driver;
    converting the first response to a second response that is associated with the first client buffer; and
    transmitting the second response to the first proxy driver.

7. The computer-implemented method of claim 1, wherein the first request is generated based on an original request issued by a client application executing on either a central processing unit included in the first client node or a graphics processing unit included in the first client node.

8. The computer-implemented method of claim 1, wherein the storage driver executes on a data processing unit, and the first proxy buffer resides on the data processing unit.

9. The computer-implemented method of claim 8, wherein the at least one operation either establishes a connection between the data processing unit and the file server or mounts a directory corresponding to the first location on the data processing unit.

10. The computer-implemented method of claim 1, wherein the storage system comprises at least one of shared file storage, shared block storage, or object storage.

11. One or more non-transitory computer readable media including instructions that, when executed by one or more processors, cause the one or more processors to process requests to access a storage system by performing the steps of:
    receiving a first request from a first proxy driver executing on a first client node, wherein the first request is associated with a first client buffer and a first location within the storage system;
    converting the first request to a second request that is associated with a first proxy buffer and the first location within the storage system; and
    transmitting the second request to a storage driver that is associated with the storage system, wherein the storage driver causes a file server to perform at least one operation at the first location in accordance with the second request.

12. The one or more non-transitory computer readable media of claim 11, wherein converting the first request to the second request comprises copying data from the first client buffer to the first proxy buffer.

13. The one or more non-transitory computer readable media of claim 11, further comprising:
receiving a third request from a second proxy driver executing on a second client node, wherein the third request is associated with a second client buffer and a second location within the storage system;
converting the third request to a fourth request that is associated with a second proxy buffer and the second location within the storage system; and
transmitting the third request to the storage driver, wherein the storage driver causes the file server to perform at least one operation at the second location in accordance with the fourth request.

14. The one or more non-transitory computer readable media of claim 11, wherein transmitting the second request to the storage driver comprises causing a virtual file system executing on a proxy node to route the second request to the storage driver based on at least one of a path name or a file handle that is included in the second request and corresponds to the first location.

15. The one or more non-transitory computer readable media of claim 11, wherein the at least one operation comprises a file write operation, a file read operation, a file open operation, a file close operation, a file creation operation, a file deletion operation, a directory listing operation, a directory creation operation, or a directory deletion operation.

16. The one or more non-transitory computer readable media of claim 11, further comprising:
receiving a first response from the storage driver; and
causing data associated with the first response to be copied from the first proxy buffer to the first client buffer.

17. The one or more non-transitory computer readable media of claim 11, wherein the first request is generated based on an original request issued by a client application executing on either a central processing unit included in the first client node or a graphics processing unit included in the first client node.

18. The one or more non-transitory computer readable media of claim 11, wherein the storage driver executes on a proxy server, and the first proxy buffer resides on the proxy server.

19. The one or more non-transitory computer readable media of claim 18, wherein the at least one operation either establishes a connection between the proxy server and the file server or mounts a directory corresponding to the first location on the proxy server.

20. A system comprising:
one or more memories storing instructions; and
one or more processors coupled to the one or more memories that, when executing the instructions, perform the steps of:
receiving a first request from a first proxy driver executing on a first client node, wherein the first request is associated with a first client buffer and a first location within a storage system;
converting the first request to a second request that is associated with a first proxy buffer and the first location within the storage system; and
transmitting the second request to a storage driver that is associated with the storage system, wherein the storage driver causes a file server to perform at least one operation at the first location in accordance with the second request.

* * * * *